United States Patent [19]
Corby, Jr. et al.

[11] Patent Number: 5,524,258
[45] Date of Patent: Jun. 4, 1996

[54] REAL-TIME PROCESSING OF PACKETIZED TIME-SAMPLED SIGNALS EMPLOYING A SYSTOLIC ARRAY

[75] Inventors: Nelson R. Corby, Jr., Scotia; Paul D. Miller, Altamont, both of N.Y.

[73] Assignee: General Electric Company, Schenectady, N.Y.

[21] Appl. No.: 268,343

[22] Filed: Jun. 29, 1994

[51] Int. Cl.$^6$ .................................................. G06F 15/76
[52] U.S. Cl. .................... 395/800; 370/94.1; 364/232.8; 364/260; 364/DIG. 1
[58] Field of Search ...................... 395/775, 800, 395/840, 845, 871; 375/106; 364/400, 130, 724; 370/94.1

[56] References Cited

U.S. PATENT DOCUMENTS

| | | | |
|---|---|---|---|
| 3,702,393 | 11/1972 | Fuss | 235/156 |
| 4,709,344 | 11/1987 | Crawford | 364/724 |
| 5,034,907 | 7/1991 | Johnson et al. | 364/724.16 |
| 5,187,795 | 2/1993 | Balmforth et al. | 395/800 |
| 5,375,228 | 12/1994 | Leary et al. | 395/575 |
| 5,392,448 | 2/1995 | Frankel et al. | 395/800 |
| 5,434,981 | 7/1995 | Lenihan et al. | 395/275 |
| 5,440,740 | 8/1995 | Chen et al. | 395/650 |

OTHER PUBLICATIONS

U.S. Patent application entitled "Real–Time Acquisition and Archiving System for Multiple Time–Sampled Signals", N. R. Corby, Jr., R. A. Hogle (Atty. Docket No. RD–23653).

U.S. Patent application entitled "Real–Time Visualization System for Multiple Time Sampled Signals", N. R. Corby, Jr., C. A. Nafis, P. D. Miller (Atty. Docket No. RD–23770).

U.S. Patent application entitled "Real–Time Processing of Packetized Time–Sampled Signals Employing a Systolic Array" by N. R. Corby, Jr., P. D. Miller (Atty. Docket No. RD–23771).

*Primary Examiner*—Alyssa H. Bowler
*Assistant Examiner*—Dhiren R. Odedra
*Attorney, Agent, or Firm*—Lawrence P. Zale; Marvin Snyder

[57] ABSTRACT

A real-time data processing system employs a control computer which defines a pre-processing arrangement of data channels to speed processing, and an arrangement of output data channels to provide a desired output format. The data channels are samples and arranged into a data packet which is passed to an array of digital signal processors (DSPs) arranged in a series of stages, with at least one DSP per stage. A front-end DSP receives the data packet and appends a control field having commands addressed to specific DSPs to the data packet along with adding a monitor field. The DSPs monitor the control field for commands addressed to it and then executes those. The status of the operation is written in the monitor field and the data packet is passed to DSPs of the next stage for 'pipelined' processing. DSPs of the last stage collect the process portions of the data packet, assemble them according to the desired output format and pass on the completed data packet. The system control computer may monitor the monitor field of any data packet and determine the health of each DSP.

2 Claims, 4 Drawing Sheets

REAL-TIME PROCESSING OF PACKETIZED TIME-SAMPLED SIGNALS EMPLOYING A SYSTOLIC ARRAY

CROSS REFERENCE TO RELATED APPLICATIONS

This invention is related to U.S. Patent applications Ser. No. 08/267,623, filed Jun. 29, 1994 "Real-Time Acquisition and Archiving System for Multiple Time Sampled Signals" by N. Corby, R. Hogle; and Ser. No. 08/267,622, filed Jun. 29, 1994 "Real-Time Visualization System for Multiple Time Sampled Signals" by N. Corby, C. Nails, P. Miller; both assigned to the present assignee and hereby incorporated by reference.

BACKGROUND OF INVENTION

1. Field of the Invention

The present invention relates to a method and system for digital signal processing, and more specifically for synchronizing, controlling and monitoring a group of processors arranged as a cascade of processing stages.

2. Description of Related Art

Many tasks in real-time signal processing systems are systolic in nature. That is, digitized samples of a signal source sampled at a regular interval are to be processed sequentially. An example of the processing may be to filter the original signal in some desired way. Typically, each digital signal sample word fed into the filter results in the production of a corresponding filtered sample. The arrival of the sample forms the "pulse" of the system, giving rise to the term systolic. Typically, it may be necessary to process dozens or hundreds of signal sources simultaneously. Usually, the samples for a given time instant are grouped together to form a packet of digital words. For the case of many signal channels, at each sample time a packet of sample words are processed rather than a single sample word. Given the finite processing capability of a given processor, it often becomes necessary to employ many processors operating together to achive the required number of computations per second.

A particularly useful way of arranging the many processors is to organize them as cascaded groups of processors, with each group forming a stage operating within the same time period. The outputs of a given stage form the inputs to the succeeding stage. The total processing task is decomposed into a finite set of sequential operations. This is called pipelining. These tasks are distributed over the stages of processor array. Thus, an output sample corresponding to a given input sample will appear at the end of the chain with a fixed time delay corresponding to the number of stages multiplied by the sampling period. All processing for a given stage must be completed within the time period between samples.

Typically there will be one input processor which accepts the input packet and one output processor which produces an output packet. However, based on data volume and arrival rates, there may be more than one input processor and more than one output processor. A simple example, based on digital signal processors ("DSPs") that can accept up to two inputs and can supply up to two outputs, is the case of a 5 stage, 10 processor array which is arranged in a 1-2-4-2-1 processor configuration.

For distributed systolic systems, the efficiency of computation directly determines how many processing cycles per processor per second are possible. This determines how many processors are required.

Often, in order to maximize the efficiency of the systolic processor it is necessary to organize the contents of the incoming packet in special ways. Unfortunately, past systems typically have used a fixed packet structure in which the samples of the packet have not been organized with computing efficiency in mind. As processing demands change over time (in response to operator changes) the fixed arrangement causes a loss of efficiency.

A common problem in such multi-stage, packet-based systolic processors is the need to communicate with and monitor the function of each of the possibly hundreds of processors. Such communication is needed, for example, to change filter parameters in order to adaptively filter a signal over a long time interval or to otherwise process samples in response to an operator's needs. As processing proceeds, it may also be necessary to determine if the specified filtering is proceeding smoothly or if the operation of the processors are operating correctly. In order to debug a complex systolic array, it is necessary to be able to verify the actions of each processor. It can be prohibitively expensive or complex to attempt to provide a communication channel from each signal processor element to a centralized control processor.

SUMMARY OF THE INVENTION

The invention describes a system and method of distributed control, synchronization and monitoring of a systolic network of processors which are connected to each other by communication channels. The present invention also provides enhanced efficiency and flexibility of computation through the use of programmable 'slotmaps' to define the arrangement of sensor channels within a packet.

The present invention is most useful in processing real-time sampled data systems where one or more signals are sampled at a regular rate and the sampled signals are converted to a digital representation by an analog to digital (A/D) converter. All samples for a given time instant are grouped into a packet of digital words. Packet boundaries may be marked by brief pauses between packets or may be marked by extra digital words attached.

A programmable 'source slotmap' memory acts as a guide to assemble data packets before processing by the processor array. The contents of the source slotmap may be changed during processing by input from an operator through a central control processor to suit changing conditions or processing demands. The source slotmap memory allows for arbitrary arrangements of samples within the packet as well as for multiple copies of samples to be included within the packet. Thus, the number of words in the packet may be larger than the number of original sample words. The repetition of data words minimizes time consuming data copying operations within the processors of the array.

This invention also provides for an output slotmap memory to guide the construction of the output packet from the systolic processor. The output slotmap is also programmable and can be altered or replaced over time by a central control processor.

Processors in the systolic array are controlled and monitored without connections between each processor of the array and a central control processor. This is done by adding a word, or group of words, to the original data packet, forming an "augmented" packet. Each processor in the systolic array processes this augmented packet rather than the original packet. The added word or words is called the "heartbeat" segment of the augmented packet. As packets are split or copied and pass through the processing elements of the systolic array, the heartbeat segments travel along. Thus, heartbeat segments will eventually be received by an intended processor. Heartbeat segments are merged to produce an output packet, which has the status of each processor for this time period.

The heartbeat segment is made up of two fields, the control field and the monitor field. There are many possible ways to implement these fields. The control field contains information that allows an individual processor to determine if there is a relevant message within the control field and may contain additional information such as parameter values or predetermined coded commands. The monitor field contains status information added by the processor handling the augmented packet. Thus, a central control processor may communicate with any processor by attaching messages to the input stream of packets and may evaluate the status of any processor by monitoring the output stream of packets.

OBJECTS OF THE INVENTION

It is an object of the present invention to provide a method for controlling and monitoring the operation of all processors in the systolic array without requiring connections between each processor of the array and a central control processor.

It is another object of the present invention to provide a device for real-time processing of signals from a large number of sensors.

It is another object of the present invention to provide a device capable of programmable digital signal processing which may be interactively altered to provide enhanced processor efficiency.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawing(s) in which:

DETAILED DESCRIPTION OF THE INVENTION

Figure 1:
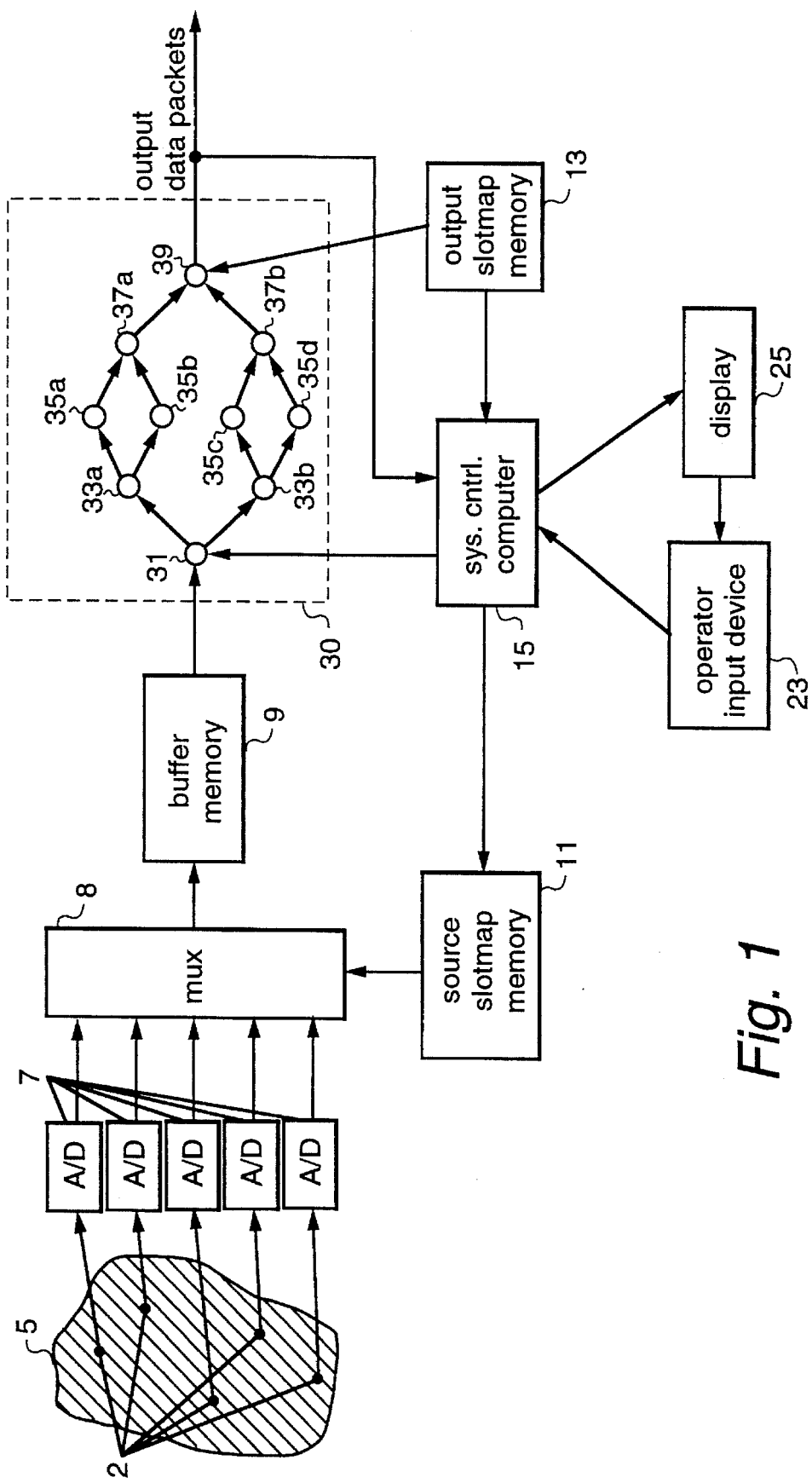
FIG. 1 is a block diagram of a system using this invention for processing signal samples and controlling and monitoring processors of a systolic array.

In FIG. 1, a transducer array, comprised of a large number of transducers 2, monitors physical parameters of an object 5. Each transducer produces a sensor signal which, if analog, are digitized by a plurality of analog to digital (A/D) converters 7. The A/D converters 7 sample and digitize their input signals at a regular rate related to the bandwidth of the signals. The digitized signals from each transducer is referred to as a sensor channel.

A system control computer 15, coupled to a source slotmap memory 11, receives operator input from an operator input device 23. The operator input determines the order in which sensor channels are to be arranged in a data packet to be provided to a processor array 30. This order is stored as a 'source slotmap' in source slotmap memory 11. The source slotmap is used by a multiplexor ("mux") 9 in constructing the data packets.

The data channels are supplied to mux 8 which reads the front-end slotmap from source slotmap memory 11 and creates a packet with samples from channels arranged in the order specified by the source slotmap. The packet packet produced by mux 8 may consist of one or more copies of the appropriate signals arranged in a specified order.

After each packet is assembled, it may be temporarily stored in a buffer memory 9, sent directly to processor array 30. Processor array 30 is a systolic array of digital signal processors ("DSPs"), separated into several stages, each stage having one or more DSPs. The stages perform digital signal processing sequentially on a data packet in a pipeline fashion. The DSPs are connected as a cascade of stages each of which perform a set of processing actions within a fixed time period which is less than or equal to the sampling period of the A/D converters. The simplest arrangement consists of a cascade of three processors: a front-end processor, an intermediate processor and a clean-up DSP. Due to the volume of calculations that must be performed each second, it is often necessary for each stage to employ many processors in parallel. The five stage, 10 processor example mentioned previously will be used for illustration.

The data packet from buffer memory 9 is passed to one or more front-end DSPs 31 of processor array 30. Front-end DSP 31 is connected to system control computer 15 and second stage processors of the systolic array, here DSPs 33a, 33b. System control computer 15 is connected to operator input device 23 and display device 25. Any operator actions that necessitate changes to the processing activities of the DSPs of array 30 are communicated to front-end DSP 31. Front-end DSP 31 is responsible for transforming the incoming dam packet into an augmented packet by creating and attaching a control field and a monitor field. The input processor provides multiple copies of the augmented packet to all second stage DSPs 33a, 33b. There may be more than one front-end DSP depending on the volume of data flowing through array 30.

Figure 2:
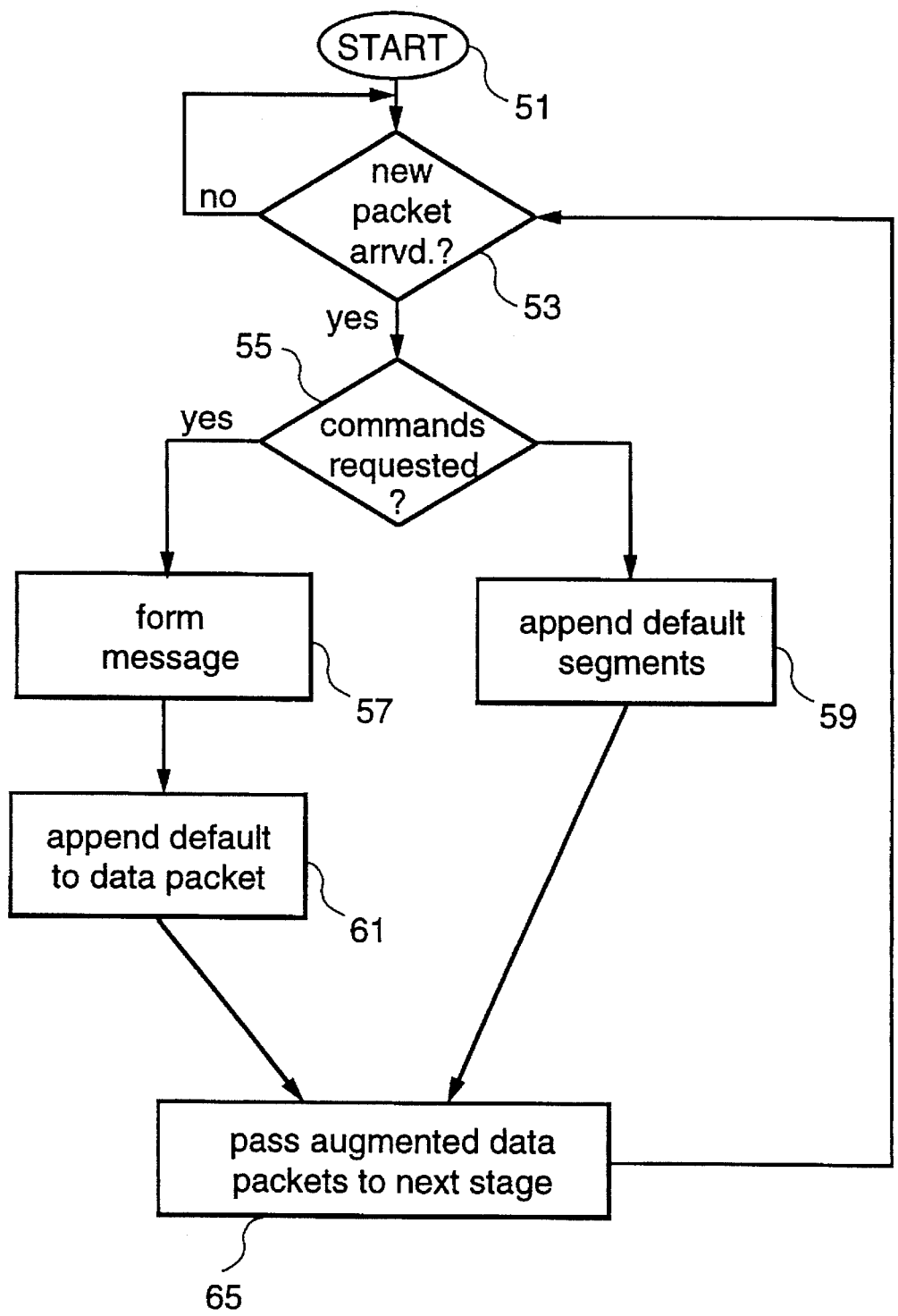
FIG. 2 is a flowchart which illustrates the operation of the front-end processor or processors of the systolic array according to the present invention.

FIG. 2 gives a flow chart illustrating the operation of the input processor. Processing begins at 'start', block 51. Front-end DSP 31 loops at block 53 waiting for the arrival of a new packet. Once the packet has arrived, the input processor determines whether there are any changes that need to be communicated by checking for messages or data on the line from system control computer 15. If no changes need to be communicated, "default" control and monitor segments are created and appended to the data packet, forming an augmented packet. Default control segments have predetermined words which delineate the beginnings and ends of the control field, with null charactors between the delineators. Similarly, default monitor segments have predetermined words which delineate the beginnings and ends of the control field, with null charactors between the delineators.

If control information needs to be communicated, front-end DSP 31 forms the appropriate control field messages and appends these messages and the monitor field to the data packet to form the augmented packet in blocks 57, 61. These control field messages are directed to a specific processor, by a routing ID, and contain commands which that processor is to execute during this time period. These may encompass any type of digital signal processing, or component thereof. If additional parameters or commands are required which will not fit in the control field, there may simply be a pointer to a memory location in buffer memory 9, or other available memory, where the DSP may find the required information.

The last action is to pass one or more copies of the augmented packet to a second stage DSP. The control fields of each augmented packet will be the same. The input processor then returns to block 51 'start' to await the arrival of the next data packet.

Figure 3:
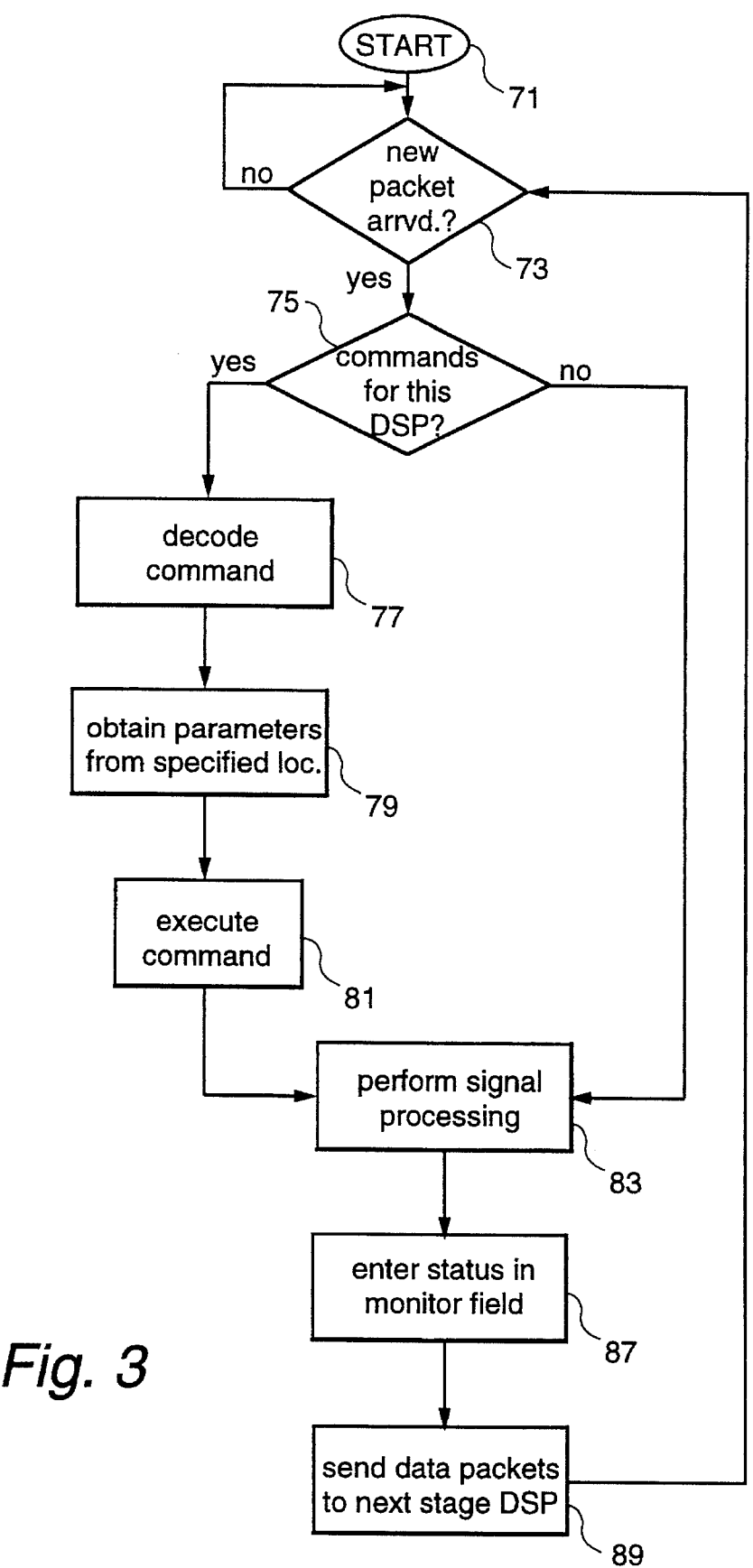
FIG. 3 is a flowchart which illustrates the operation of intermediate processors internal to the systolic array according to the present invention.

FIG. 3 is a simplified flowchart for intermediate DSPs 35a, 35b, 35c, 35d of the systolic array. The processor begins at block 71 labelled 'start' and awaits the arrival of all incoming packets at block 73. When all packets have arrived, the processor checks the control field to determine if there are any specific commands that are addressed to this DSP. If there are no messages, the DSP begins signal processing the data packets according to a predetermined program.

If there are commands addressed to it, the processor isolates these commands, decodes the commands and executes the commands in blocks 77, 79, 81. For example, a filter program may be changed or a coefficient value may be changed. The parameters needed to effect the change may be included within the control field or they may be resident in some location indicated by the control field. After the changes are effected, the signal processing of the data packet begins in block 83. After processing is complete, the DSP builds an augmented data packet in block 85 according to its internal program. Any status or processing information at the current time step are added to the heartbeat monitor field in block 87. The DSP then passes the packets to the DSP(s) of the succeeding stage to which it is connected in block 89. The DSP then returns to 'start', block 71, and awaits the arrival of the next packet. The processors may be required to merge status fields before passing the packet to the next stage. The resultant augmented packet is output to a DSP of the next stage.

Figure 4:
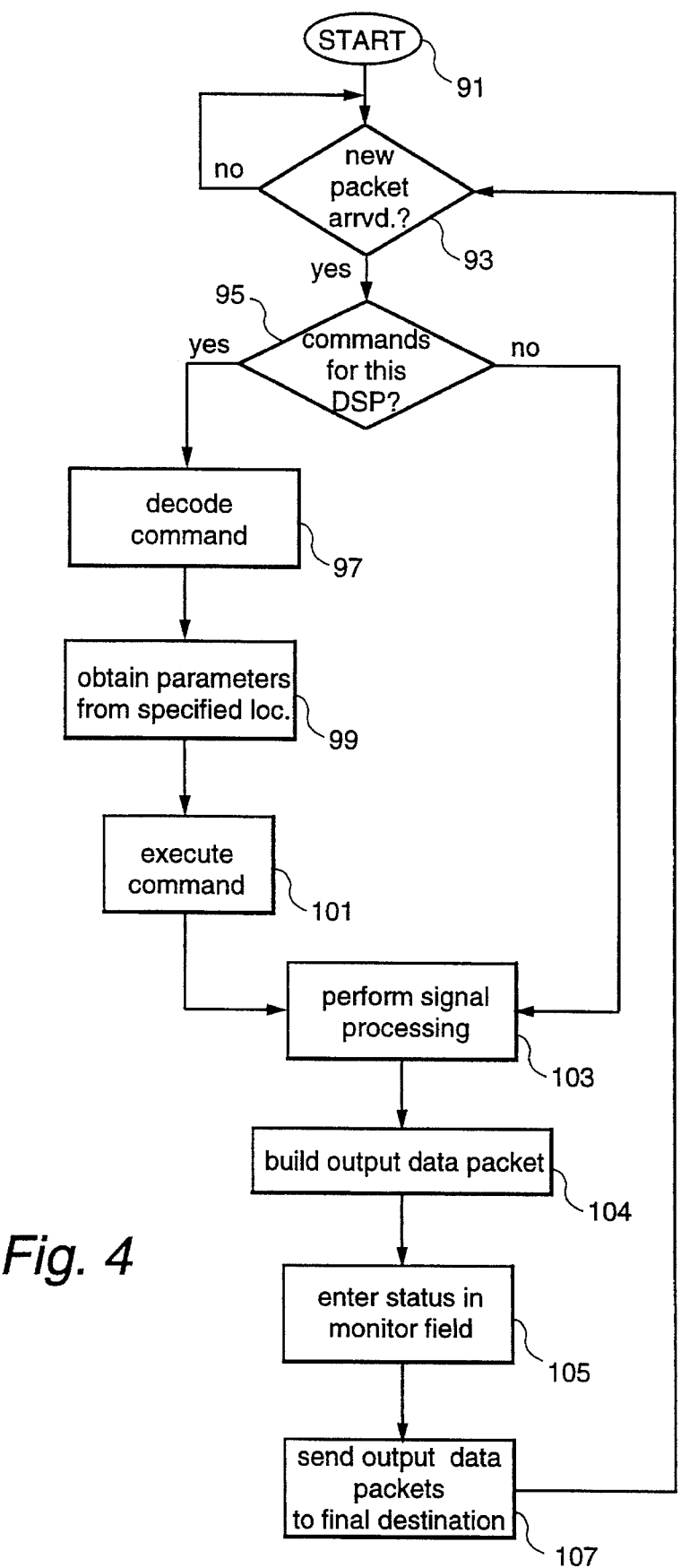
FIG. 4 is a flowchart that illustrates the operation of a typical output processor or processors according to the present invention.

FIG. 4 is a simplified flowchart of the output stage of the systolic array. DSP 39 begins at block 91 'start' and awaits the arrival of all incoming packets in block 93. When the packets have arrived, DSP 39 checks the control field for commands that apply to DSP 39 in block 95. If there are no specific commands, the DSP 39 begins the final stage processing of the data packets according to a predefined program.

If commands are addressed to DSP 39, it isolates the command that applies to it, decodes the command, obtains required parameters and executes the command in blocks 97, 99, 101. As above, a filter program may be changed or a coefficient value may be changed, etc. After the command has been executed, the final stage processing of the data packet begins. This usually consists of building a final output data packet. DSP 39 is connected to the output slotmap memory 13 which is connected to the system control computer 15. An output slotmap is stored in the output slotmap memory by system control computer 15. The designated processed signals from the DSPs are arranged in the order specified by the output slotmap and the control field is removed, if desired. The contents of the output slotmap memory may be changed at any time by operator input to system control computer 15.

There is a communication channel between DSP 39 and the system control computer 15 to allow the system control computer to examine the output data packet contents. The resultant output data packet may then be utilized or stored.

While only certain preferred features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A real-time digital signal processing system for processing digital samples from a plurality of sensor signals, comprising:
   a) a source slotmap memory for storing a source slotmap indicating a number of copies of each digital sample, and order before processing;
   b) an output slotmap memory for storing an output slotmap indicating an order in which sensor signals are to be arranged when output from the system;
   c) a programmable multiplexer, coupled to the source slotmap memory, for receiving, duplicating, deleting, and arranging the digital samples and creating a data packet with the samples from a specific time period, according to the source slotmap;
   d) a systolic array having a plurality of digital signal processors (DSPs) arranged in cascading subsequent stages having:
      i. at least one front-end DSP in a first stage for receiving the data packet, for receiving commands to be sent to selected DSPs, for creating an augmented data packet having a portion of the data packet, the commands at locations within the augmented data packet corresponding to specified DSPs, and a status field for each DSP coupled to it, and for passing the augmented data packet to DSPs coupled to it;
      ii. at least one intermediate DSP functionally coupled to the front-end DSP for executing commands in the augmented data packet corresponding to it, processing the portion of the data packet which it receives into processed data, determining a status of its processing, updating the status field, replacing the data with the processed data, thereby creating an updated augmented data packet, and passing the updated augmented packet segment to a DSP of a subsequent stage,
      iii. at least one clean-up DSP in a last stage coupled to DSPs of a previous stage, and coupled to the output slotmap memory, for receiving the processed packet segments from the DSPs of the previous stage, and for creating a data packet having the processed packet segments of the DSPs arranged according to the output slotmap in the output slotmap memory.

2. The real-time digital signal processing system for processing digital samples of claim 1 further comprising:
   a) a operator input device for interacting with an operator to receive parameters selecting sensor signals desired to be monitored and identifying processing to be performed on the selected sensor signals;
   b) a system control unit coupled to the operator input device, the source slotmap memory, the output slotmap memory, the front-end processor, and the clean-up DSP for receiving the parameters from the operator input device and for adjusting the source slotmap, the output slotmap, and for providing DSP commands to the front-end processor causing the selected sensor signals to be processed as identified.

* * * * *